(No Model.)
J. J. MEYER.
PIPE CLOSER.
No. 543,745.　　　　　Patented July 30, 1895.
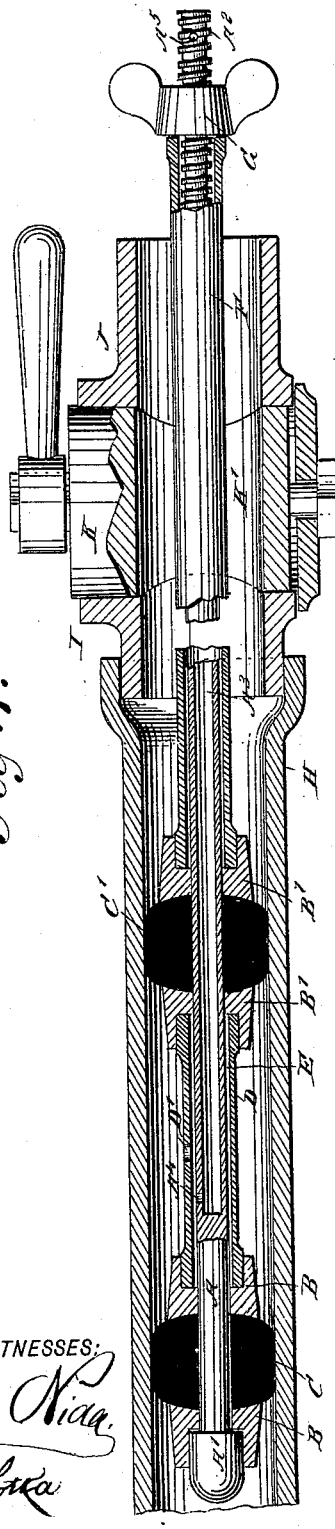
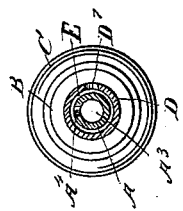
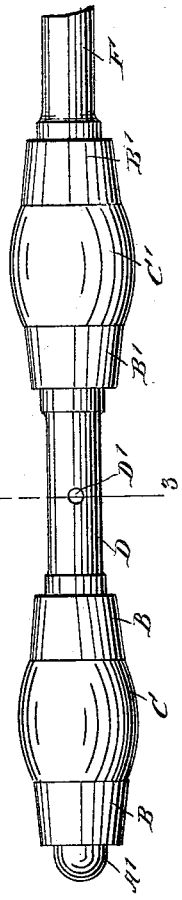
WITNESSES:
Chas. Nida
John Lotka
INVENTOR
J. J. Meyer
BY
Munn & Co
ATTORNEYS.

UNITED STATES PATENT OFFICE.

JOHN J. MEYER, OF NEW YORK, N. Y.

PIPE-CLOSER.

SPECIFICATION forming part of Letters Patent No. 543,745, dated July 30, 1895.

Application filed March 13, 1895. Serial No. 541,579. (No model.)

*To all whom it may concern:*

Be it known that I, JOHN J. MEYER, of New York, in the county and State of New York, have invented a new and useful Improvement in Pipe-Closers, of which the following is a full, clear, and exact description.

The invention relates to a tool to be used for closing pipes when it is desired to repair them in places where a stop-cock cannot be used for shutting off the supply of water, and is intended to furnish a substitute for the usual inconvenient method of freezing the pipe.

The invention will be fully described hereinafter, and the features of novelty pointed out in the claims.

Reference is to be had to the accompanying drawings, forming a part of this specification, in which similar letters of reference indicate corresponding parts in all the views.

Figure 1 is a broken longitudinal section showing the tool applied to a pipe. Fig. 2 is an elevation illustrating one end of the tool, and Fig. 3 is a cross-section taken on the line 3 3 of Fig. 2.

The improved tool consists of a stem A, having at one end a head A', and screw-threaded at the opposite end, as shown at $A^2$. The stem A is hollow for the major portion of its length, the bore being designated as $A^3$. Said bore is open at the threaded end $A^2$ of the stem, and is provided at its other or inner end with a lateral aperture $A^4$.

On the stem A, adjacent to the head A', are located collars B, clamping between them an expansible washer C, it being understood that the washer is of greater diameter than the clamping-collars B, and fits tightly on the stem A. The outer collar B is connected by a sleeve D, which surrounds the stem A at a distance so as to form an annular chamber E between the sleeve and the stem. The outer end of the sleeve D is connected to a clamping-collar B', which, together with another clamping-collar B', holds a second washer C' in position. The outer end of this second collar B' is engaged by a tube F surrounding the stem A and actuated by a wing-nut or equivalent device G. The sleeve D is provided with an aperture D', whereby the chamber around the said sleeve communicates with the chamber E and with the stem.

The apparatus is used as follows: The nut G is turned to push the tube F and the collars B' and B inward and expand the washers C and C' until they are of substantially the same diameter as the bore of the pipe it is intended to repair. The pipe is then cut or broken off and the tool is quickly inserted into the open pipe, so that only one gush of water can escape therefrom. The nut G is then given a few turns to force the washers C and C' into tight engagement with the walls of the pipe H.

In order to prevent the stem A from rotating while the nut G is being turned, a pin may be passed through an opening $A^5$ provided for that purpose in the screw-threaded end $A^2$ of the stem, this pin being removed as soon as the tool is properly adjusted. The washer C is mainly relied upon to tightly close the pipe, but if any water should leak past the washer C this water would exert no pressure on the washer C, but escape through the aperture D' into the chamber E, and then through the opening $A^4$ into the bore $A^3$ of the stem A. It will be seen that in this manner the pressure within the pipe is placed under the perfect control of the operator, that the tool cannot be forced out of the pipe by the pressure of the water, and that repairs may be readily made. The shape of the washers is immaterial, and they are usually made of rubber or of some like expansible material.

It will be understood that the improved tool may be used likewise for closing gas-pipes.

In order to remove the tool from the pipe without any considerable loss of water, I employ a stop-cock I of substantially the usual construction, said stop-cock having a tubular casing J whose bore is approximately equal in diameter to that of the pipe H, and a plug K whose bore K' is large enough to allow the washers C C' to pass through it. The casing J of the stop-cock is slid over the tool either before or after its introduction into the pipe H. In the latter case the nut G must be small enough to allow it to enter the bore of the casing J. A suitable connection is then made between the pipe H and the casing of the stop-cock, such as by expanding the end of the pipe H and fitting the end of the stop-cock into the expanded end. The tool may then be withdrawn by slightly unscrewing the nut G and sliding the washers outward until the inner washer C has passed outward beyond the plug K, and while the said inner washer still closes the outer end of the casing J the plug K is turned to close the stopcock, whereupon the tool may be withdrawn entirely.

Having thus described my invention, I claim as new and desire to secure by Letters Patent—

1. The combination of the stem hollowed out for a portion of its length and open at its outer end, a plurality of washers on the stem, the stem being provided with an aperture between two adjacent washers to receive water leaking past the inner washer, and means for expanding the washers, substantially as described.

2. The combination of a stem having a longitudinal bore, open at its outer end and having a lateral aperture near its inner end, expansible washers surrounding the stem, one at each side of the said lateral aperture, a sleeve between the said washers and surrounding the stem, and means for expanding the washers, substantially as described.

3. The combination of a stem having a longitudinal bore, open at its outer end and having a lateral aperture near its inner end, expansible washers surrounding the stem, one at each side of the said lateral aperture, a sleeve surrounding the stem at a distance and provided with a lateral aperture, and means for expanding the washers, substantially as described.

JOHN J. MEYER.

Witnesses:
WILLIAM H. MARZ,
GEORGE SCHEER.